United States Patent [19]

Murray

[11] Patent Number: 5,353,180

[45] Date of Patent: Oct. 4, 1994

[54] AIR BEARING MAGNETIC SLIDER WITH WISHBONE-SHAPED RAILS

[75] Inventor: Stephen S. Murray, Fremont, Calif.

[73] Assignee: Read-Rite Corporation, Milpitas, Calif.

[21] Appl. No.: 117,484

[22] Filed: Sep. 7, 1993

Related U.S. Application Data

[63] Continuation-in-part of Ser. No. 24,476, Mar. 1, 1993, abandoned.

[51] Int. Cl.⁵ .................. G11B 5/60; G11B 21/21
[52] U.S. Cl. ............................................. 360/103
[58] Field of Search ........................................ 360/103

[56] References Cited

U.S. PATENT DOCUMENTS 5,128,822 7/1992 Chapin et al. .................. 360/103

Primary Examiner—Robert S. Tupper
Attorney, Agent, or Firm—Nathan N. Kallman

[57] ABSTRACT

The air bearing surface of a magnetic head slider is formed with two side rails and a wishbone-shaped rail configuration between the side rails, which may be rectangular or ablated. The rail configuration includes segments forming a V and segments extending from the V rail segments towards the trailing edge of the slider. The rail configuration is centered or offset relative to the sides of the slider. Leading edge tapers are provided for the side rails and rail configuration.

15 Claims, 5 Drawing Sheets

1 …

AIR BEARING MAGNETIC SLIDER WITH WISHBONE-SHAPED RAILS

This application is a continuation-in-part of application Ser. No. 08/024,476, now abandoned filed Mar. 1, 1993.

CROSS-REFERENCE TO COPENDING PATENT APPLICATION

Copending U.S. patent application Ser. No. 07/982,853 filed Nov. 30, 1992 on behalf of Stephen S. Murray, and assigned to the same assignee, discloses magnetic head sliders having air bearing surfaces with configured rails.

FIELD OF THE INVENTION

This invention relates to air bearing magnetic head sliders used in disk drives and in particular to head sliders with configured air bearing surfaces.

BACKGROUND OF THE INVENTION

A magnetic recording head assembly used in a disk drive typically incorporates an air bearing slider carrying at least one magnetic transducer that flys over the surface of a magnetic disk for transducing data signals. One objective for improving the transducing relationship between the magnetic transducer and the magnetic disk is to provide a low flying height or very close spacing between the transducer and the disk during operation of the disk drive. When used with very narrow transducing gaps and very thin magnetic films, the close spacing allows short wavelength, high frequency signals to be recorded, thereby affording high density, high storage capacity recording. It is also desirable to maintain a substantially constant flying height and a tightly controlled pitch of the slider relative to the disk surface so that the signal being processed is accurate. To realize controlled pitch and constant flying height, pitch stiffness of the air bearing slider needs to be controlled.

One known type of air bearing slider, illustrated in FIG. 1, employs a cross bar or cross rail adjacent to the leading edge of the slider. The leading edge of the slider is the edge over which air first passes to provide aerodynamic lift to the slider during operation in a disk drive. The trailing edge of the slider is opposite to the leading edge. A magnetic transducer for recording and reading data on a magnetic disk is located at the trailing edge. A subambient pressure region is produced to provide a self-loading slider with fast liftoff during operation of the magnetic heads in disk drives. Such head sliders are known to be subject to entrapment of stray particles, which can cause head crashes and undue wear of the slider.

SUMMARY OF THE INVENTION

An object of this invention is to provide an air bearing slider having a configuration that substantially avoids entrapment of stray particles.

Another object of this invention is to provide an air bearing slider which minimizes or eliminates head crashes.

Another object is to provide an air bearing slider that reduces wear of magnetic heads and disks during data signal processing.

A further object is to provide an air bearing slider having controlled pitch stiffness.

According to this invention, the air bearing surface (ABS) of a head slider is formed with a wishbone-shaped rail configuration between two side rails. The wishbone-shaped rail configuration includes first and second rail branches or segments which meet to form a V pattern at one end of each segment, with a third segment that extends from the closure of the V pattern to a narrow taper at the leading edge of the head slider. The other ends of the segments of the V pattern are connected to fourth and fifth segments which extend towards the trailing edge of the slider and are substantially parallel to the sides of the slider. Leading edge tapers, each of substantially the same length but of greater width than the narrow taper adjacent to the third segment of the wishbone-shaped rail configuration, are provided adjacent to the side rails. In one embodiment, the side rails are substantially rectangular and extend to the trailing edge of the slider. In another configuration, the side rails have an ablated geometry. During operation in a disk drive for example, when the air bearing slider is flying relative to the disk surface, the wishbone-shaped geometry between the side rails provides a subambient pressure or negative pressure region between the spaced segments of the wishbone-shaped rail pattern.

DESCRIPTION OF THE DRAWINGS

The invention will be described in greater detail with reference to the drawings in which.

DETAILED DESCRIPTION OF THE INVENTION

Figure 1:
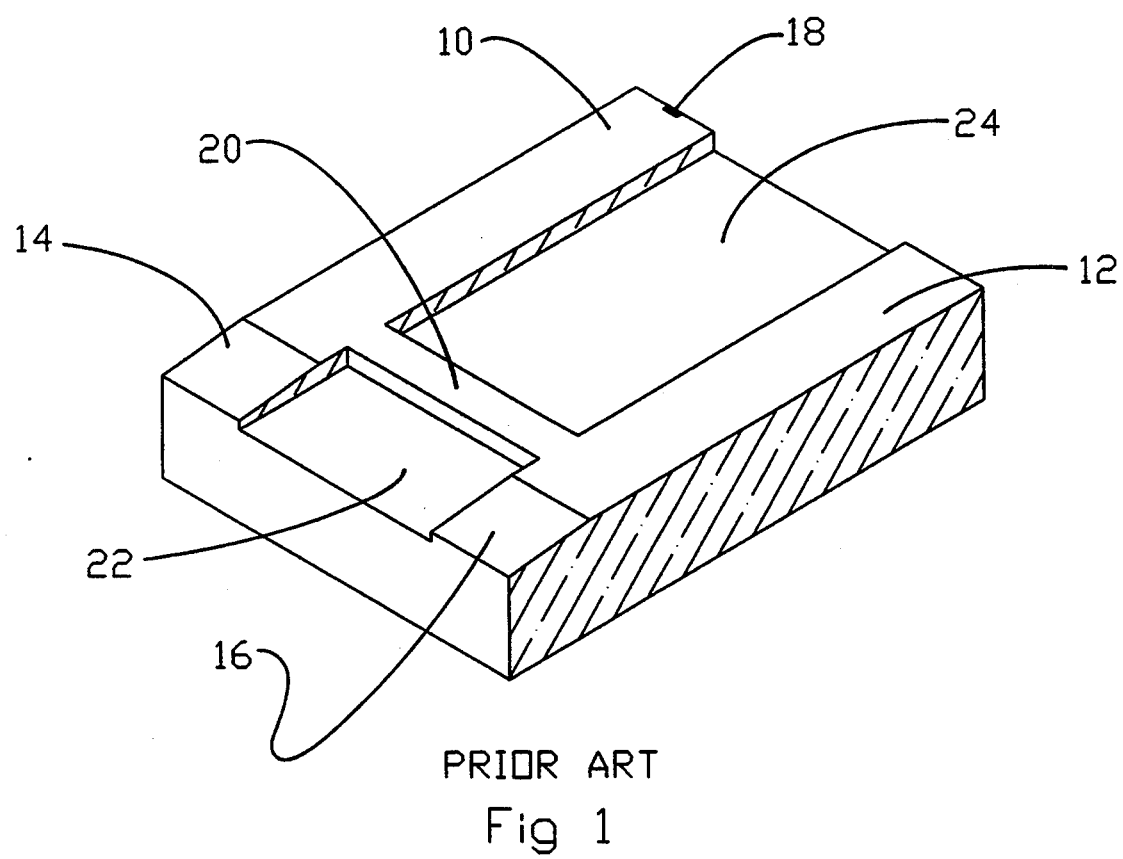
FIG. 1 is an isometric view of a prior art air bearing slider having a crossbar between a recess at the slider leading edge and a recess serving as a negative pressure region.

With reference to FIG. 1, a prior art air bearing slider is formed with two rectangular side rails 10 and 12 that extend from leading edge tapers 14 and 16 to the trailing edge of the slider. A thin film magnetic transducer 18 is provided at the trailing end of rail 10 for recording and sensing data that is registered on a magnetic disk (not shown). This prior art slider design includes a crossbar 20 extending across the slider width between the rails 10 and 12. The crossbar 20 separates a centered forward cavity 22 at the slider leading edge between the tapers 14 and 16 and a recess 24 forming a subambient pressure region extending from the crossbar to the trailing edge of the slider between the rails 10 and 12. With this prior art design, loose particles in the disk drive tend to land in the forward cavity 22 and are trapped by the crossbar 20. The accumulated particles may cause head crashes and undue wear of the head and disk.

Figure 2:
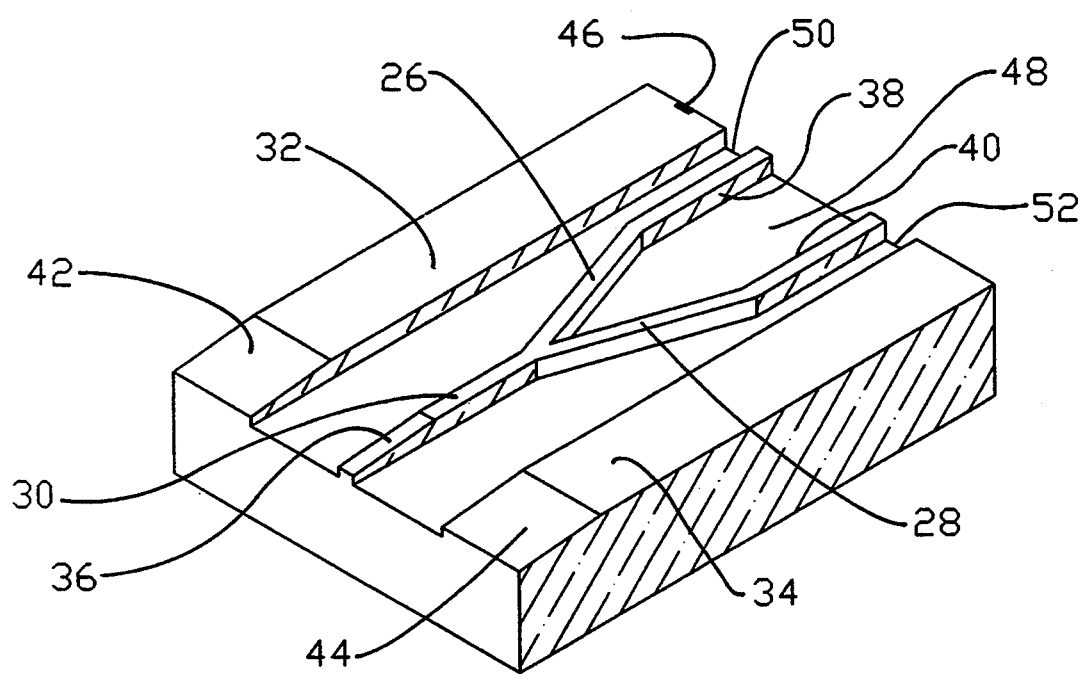
FIG. 2 is an isometric view of an air bearing slider having a wishbone-shaped rail configuration, according to this invention.

In accordance with this invention, an air bearing slider shown in FIG. 2 incorporates a wishbone-shaped rail configuration having two angled rail segments 26 and 28 that close to form a V pattern. The rail segments 26 and 28 are angled preferably between 30°-60° relative to the center longitudinal axis of the slider that extends through the front segment 30 and taper 36. The third segment 30, which is substantially parallel to the sides of the slider and side rails 32 and 34, extends from the V pattern closure to the leading edge narrow taper 36. Fourth and fifth segments 38 and 40 are formed at the ends of the V pattern rails 26 and 28. The segments 38 and 40 are of equal length and substantially parallel to the side rails 32 and 34. The segments 38 and 40 are spaced from the side rails 32 and 34 so that continuous channels 50 and 52 are provided between the wishbone rail configuration and the side rails. Tapers 42 and 44 are formed at the leading edge of the slider adjacent to the flat side rails 32 and 34. A thin film magnetic transducer 46 is disposed at the trailing end of side rail 32. The surfaces of rails 32 and 34 and the rail segments 26, 28, 30, 38 and 40 of the wishbone rail structure are ground approximately to the same plane or level. Only one etch depth process step is needed during manufacture of the slider.

The wishbone rail configuration defines a subambient pressure region 48, which extends from the closure of the V segments 26 and 28 to the trailing edge of the slider, between the segments 26, 28, 38 and 40. With this design, loose particles in the disk drive will travel through the channels 50 and 52 around the subambient pressure region 48, thus virtually eliminating head crashes that may be caused by accumulated particles and debris.

Figure 3:
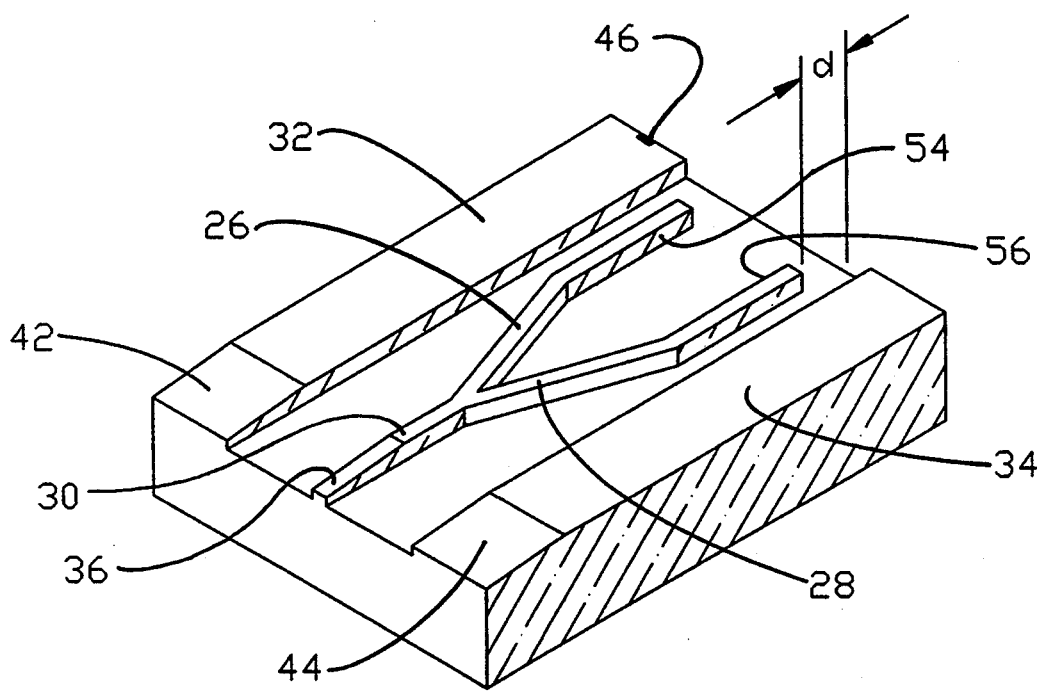
FIG. 3 is an isometric view of an alternative embodiment of an air bearing slider, made in accordance with this invention.

FIG. 3 shows a modification of the air bearing slider rail configuration of FIG. 2. During operation in a disk drive, the transducer 46 at the trailing end of the active rail 32, and the trailing end of the ballast rail 34 are at a substantially lower flying height than the interfaces between tapers 42, 36, 44 with rail 32, rail segment 30 and rail 34 respectively. Due to manufacturing tolerances, the rail surfaces of the slider and/or the surface of the associated recording disk may not perfectly flat. In such case, there is a likelihood that rail segments disposed towards the trailing edge of the slider may make contact with the rotating disk, which would result in increased disk wear or possible head crash and damage to the recording head and disk. To minimize the possible occurrence of head crash, the fourth and fifth end segments 54 and 56 are terminated so as to be spaced from the slider trailing edge by a predetermined distance d. In this way, head crashes are minimized or eliminated.

Figure 4:
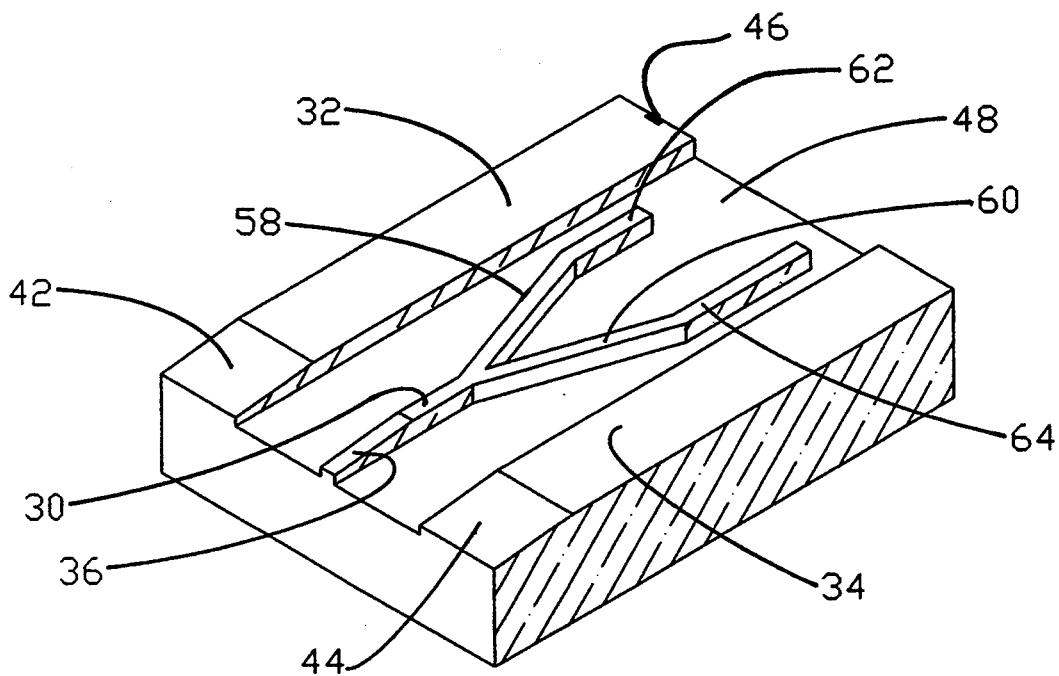
FIG. 4 is an isometric view of an air bearing slider showing a variation of the embodiment of FIG. 3.

In some disk drive designs, the air bearing slider flys at a skewed angle relative to the disk radius. The skew angle varies as the head slider moves to different data tracks. To control roll of the slider as it is moved and flys over the different tracks, an asymmetrical pressure distribution is sometimes required. In such case, the fourth segment 62 of the wishbone rail pattern, which is closer to the side rail 32 at which end the transducer is located, is made shorter than the fifth segment 64, as illustrated in FIG. 4. The ends of segments 62 and 64 are spaced at different distances from the trailing end of the slider to control roll at different skew angles.

Figure 5:
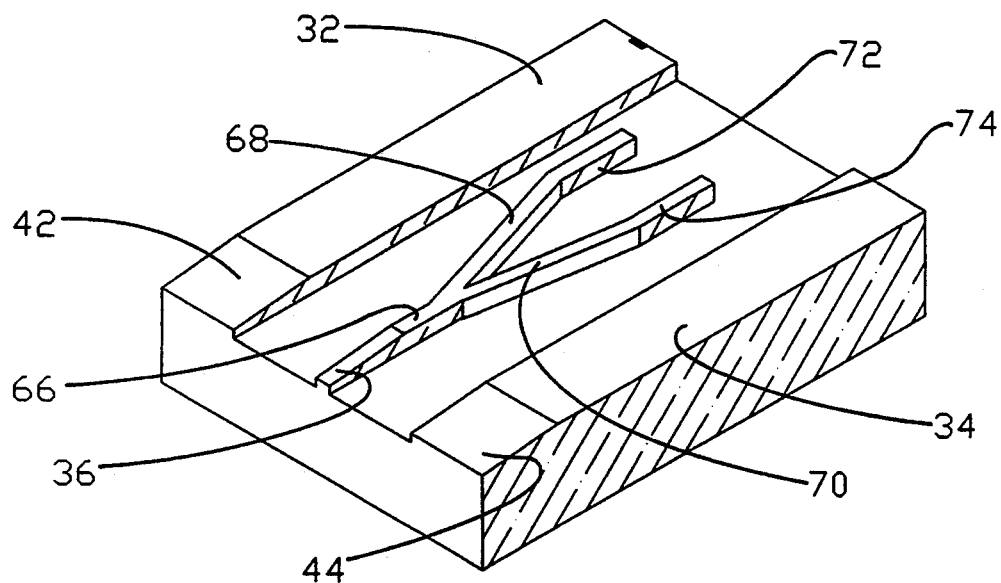
FIG. 5 is an isometric view of an air bearing slider having an off-center wishbone-shaped rail configuration.

An alternative approach to the wishbone rail configuration of FIG. 4 is depicted in FIG. 5. The segments of the wishbone configuration are moved closer to active rail 32 so that the subambient pressure region is asymmetrical relative to the width of the slider. Rail segment 68 has one side angled sharply towards the side rail 32, whereby rail segments 68 and 72 are located closer to side rail 32, and rail segments 70 and 74 are spaced further from side rail 34. Thus the load generated by the subambient pressure region 76 is asymmetrical relative to the width of the slider.

Figure 6:
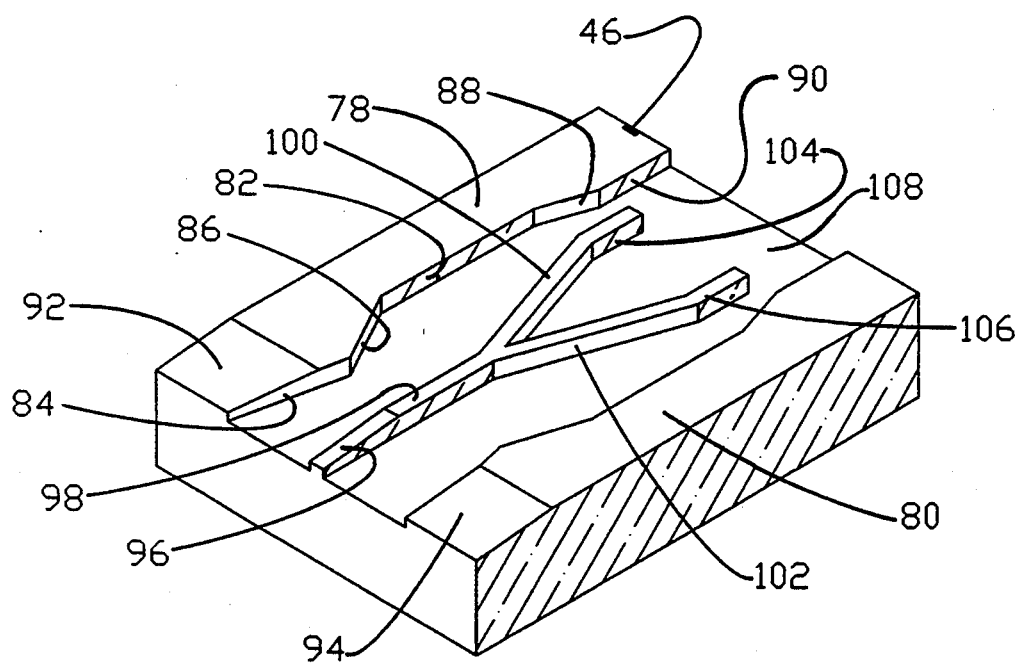
FIG. 6 is an isometric view of an air bearing slider having ablated side rails and the wishbone-shaped rail configuration. Similar numerals refer to similar elements throughout the drawings.

In FIG. 6, the air bearing slider is formed with ablated side rails 78 and 80 and a wishbone rail configuration delineating a subambient pressure region 108. The side rail 78 has a reduced narrow section 82 adjacent to a flared section 86 and a section 84 that angles collinearly with the inner side of leading edge taper 92. At the other end of the narrow rail section 82 is a flared section 88 and a rear section 90 extending to the trailing edge of the slider. The opposing side rail 80 is configured in a substantial mirror image of side rail 78 and extends from leading edge taper 94 to the slider trailing edge. The wishbone rail configuration of FIG. 6 has a front segment 98 adjacent to a narrow central leading edge taper 96. Wishbone legs 100 and 102 form a V shape with its closure at the end of segment 98. Parallel end segments 104 and 106 extend from the ends of the open legs 100 and 102 and terminate in spaced relation to the slider trailing edge. This slider design incorporating ablated rails and a wishbone configuration enables low flying height of the slider transducer close to the rotating disk surface and has reduced sensitivity of flying height to taper length. The wide rail section 90 at the end of the slider allows a relatively wide transducer coil and thereby operates with an enhanced record signal.

In an implementation of the invention, the etch depth of the recesses to define the rails was in the range of 2-12 microns or micrometers, the preferred range being between 3.5-5.5 microns. The lengths of sliders incorporating the invention is in the range of 1,000-4,000 microns, and the widths are between 50-100% of slider body length. The etch width of the segments of the wishbone rail configuration is in the range of 10-150 microns, which is smaller than the minimum width of the side rails but sufficiently wide for structural strength. The width of the channels adjacent to the wishbone rail segments is at least 80 microns to allow air to flow freely around the wishbone.

Figure 7:
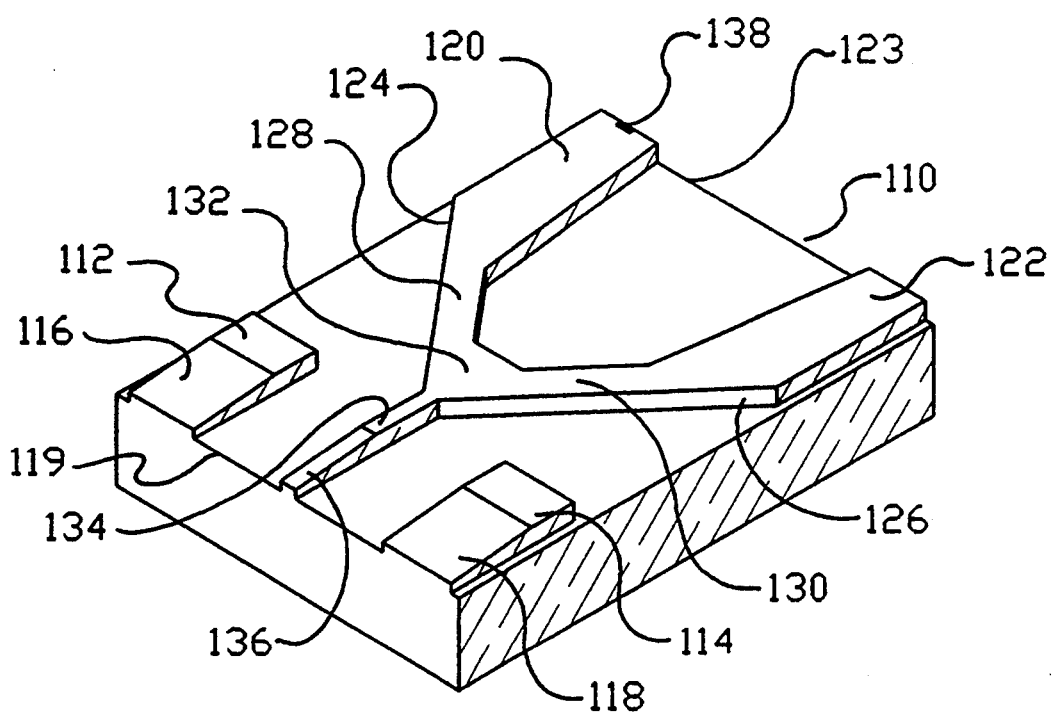
FIG. 7 is an isometric view of an alternative embodiment of an air bearing slider having a wishbone-shaped rail configuration.

With reference to FIG. 7, an air bearing slider 110 is formed with two short side pads 112 and 114 following tapers 116 and 118 at the leading edge 119 of the air bearing surface of the slider body.

A wishbone-shaped rail configuration is formed with two arms side having respective side rail portions 120 and 122 extending from the trailing edge 123 partially towards the leading edge. The rail configuration has angled portions 124 and 126 adjacent to the rail portions 120 and 122 respectively. Narrowed angled portions 128 and 130 extend from the angled portions 124 and 126 to close at a V-shaped portion 132 which is joined to a small narrow rectangular portion 134 extending from a narrow central taper 136. The side rail portions 120 and 122, as well as the side pads 112 and 114 and tapers 116 and 118, are located close to the sides of the slider body. The operative transducer 138 is located at the trailing end of the slider adjacent to the rail portion 120.

With the configuration of FIG. 7, the large central cavity between the rail portions allows greater vacuum loading as compared to the slider designs shown in FIGS. 1–6. The lift or takeoff of the slider to a desired flying height is accomplished more quickly and with a lower rotational velocity of the storage disk, which is typically used in portable laptop or notebook computers.

Figure 8:
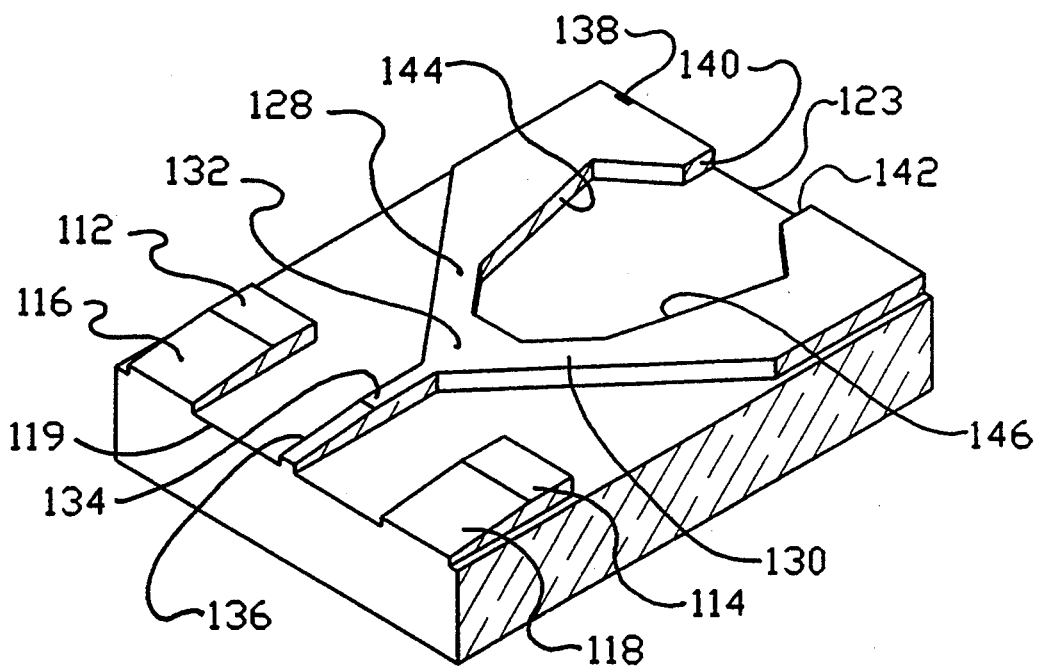
FIG. 8 is an isometric view depicting a variation of the slider of FIG. 7.

FIG. 8 shows a variation of the design of FIG. 7 wherein the inner sides of the side portions 120 and 122 are formed with angular sections 140, 142 and 144, 146. The reduced area of the side rails 120 and 122 provides a larger central cavity thereby providing an increase in the negative pressure with improved vacuum loading.

Figure 9:
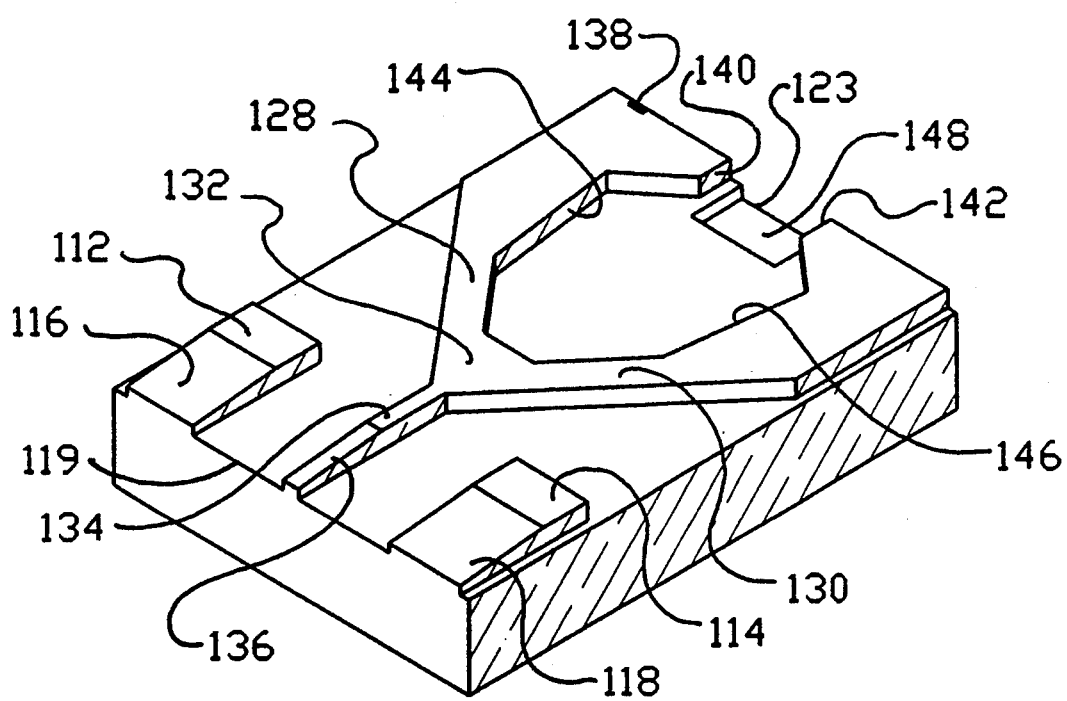
FIG. 9 is an isometric view of an air bearing slider showing a modification of the embodiment of FIG. 8.

The design of FIG. 9 is substantially similar to the design as illustrated in FIG. 8 but includes a recess 148 between the side rails at the trailing edge of the slider. To form the relief area 148, a second masking step is used. The added relief area allows a greater loading effect than that achieved with the design of FIG. 8. Also, this design provides an escape route for stray particles that may reach the air bearing slider as it interfaces with the rotating disk during operation of the disk drive.

Figure 10:
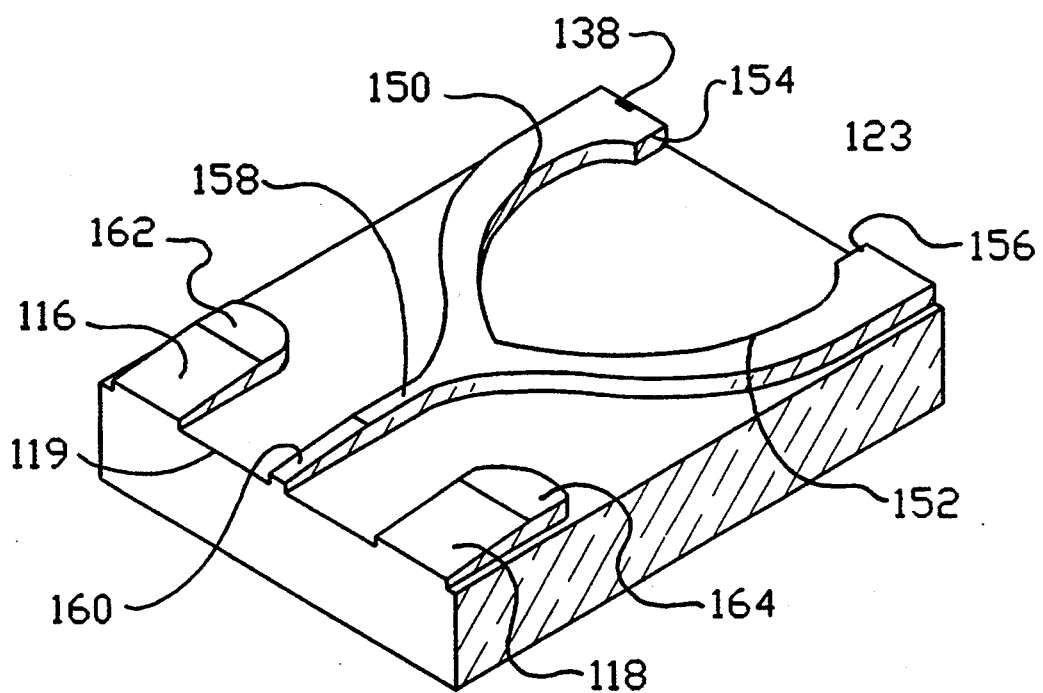
FIG. 10 is a plan view of another embodiment of an air bearing slider having a wishbone-shaped configuration.

In FIG. 10, the wishbone-shaped rail configuration is formed with curvilinear portions 150 and 152 that are disposed between short rail portions 154 and 156 at the trailing edge 123 and a narrow rectangular portion 158 which is adjacent to a narrow central taper 160 at the leading edge 119 of the slider. The side pads 162 and 164 have arcuate ends facing the curvilinear portions 150 and 152. By using curved shapes, corners are avoided which serves to reduce disk damage that may occur from a shock that is sufficient to force the magnetic head away from the disk surface and against the spring of the supporting head suspension. The suspension would then force the head slider back to the disk surface causing "head slap" with potential damage to the disk and/or the slider itself.

To implement the wishbone-shaped rail configuration of FIGS. 7–10, an etch depth of 2–12 micrometers is used for a body thickness of the slider of about 300–650 micrometers. The preferred length of the slider is 1,000–4,000 micrometers from the leading to the trailing edge, and the width between the sides of the slider is between 0.55–0.95 1000–2200 microns. With the sliders disclosed in FIGS. 7–10 the flying height of the magnetic head relative to the storage disk at a rotational velocity of about 400–2500 cm/sec. is approximately 200–1000 Angstroms.

The air bearing slider with the wishbone-shaped configuration was designed to reduce wear with minimal or no head crashes. There is no crtical point debris accumulation which would adversely affect flight attitude of the slider. The wider side rails needed to produce more lift for any given flying height and load suspension are less sensitive to variations in rail width that may occur from variations in processing and manufacture of the sliders. Also, the wider side rails provide increased damping as an additional feature. By adding a load to the air bearing which depends on slider shape, the flying attitude including flying height, pitch and roll become less sensitive to the position of the load point of the head suspension. The shape of the subambient pressure region and its position between the side rails serve to control roll as a function of disk radius, particularly in disk drives using a rotary actuator where skew changes with disk radius.

What is claimed is:

1. A substantially rectangular air bearing magnetic head slider having leading and trailing edges and substantially parallel sides comprising:

a nonmagnetic substrate having an air bearing surface;

first and second side rails formed along said sides of said surface, said first and said second side rails projecting out from said air bearing surface and having top surfaces;

a wishbone-shaped rail configuration formed between said rails on said substrate surface and projecting out from said air bearing surface, said wishbone shaped rail configuration having spaced first and second branching segments extending substantially parallel to said first and said second side rails, said wishbone shaped rail configuration extending for a portion of the distance between said trailing edge and said leading edge, said branching segments having top surfaces; and said wishbone shaped rail configuration having third and fourth branching segments disposed at an angle relative to said substantially parallel first and second sides of said first and second branching segments, said third and fourth branching segments being connected respectively to said first and second branching segments;

a narrow trunk portion having a leading edge taper projecting out from said air bearing surface and extending from said leading edge for connection to the junction of said third and fourth branching segments of said wishbone rail configuration, said wishbone -shaped rail configuration having third and fourth branching segments connected to and between said trunk portion and said first and second branching segments respectively, 2. A magnetic head slider as in claim 1, wherein said top surfaces of said side rails and said top surfaces of said branching segments are coplanar.

3. A magnetic head slider as in claim 1, including first and second leading edge tapers located at said leading edges said first and second side rails respectively.

4. A magnetic head slider as in claim 3, wherein said first and second leading edge side rail tapers include an angled side such that the width of the leading edge of each said side rail taper is less than the width of the portion of the interface segment joining the trailing edges of said side rail tapers with said first and second side rails.

5. A magnetic head slider as in claim 3, wherein said wishbone-shaped rail configuration includes first and second branching segments that form a V geometry with a closure at the forward end of each of said first and second segments, a third segment extending from said closure towards said leading edge, fourth and fifth segments extending from the trailing ends of each of said first and second segments towards said trailing slider edge, to create a subambient pressure region between said first, second, fourth and fifth segments.

6. A magnetic head slider as in claim 5, wherein said third, fourth and fifth segments are substantially parallel to said sides of said slider.

7. A magnetic head slider as in claim 5, wherein said fourth and fifth rail segments extend to said trailing slider edge.

8. A magnetic head slider as in claim 5, wherein said fourth and fifth rail segments are spaced from said trailing slider edge.

9. A magnetic head slider as in claim 1, wherein said side rails are ablated, each side rail having a narrow section between adjacent flared sections.

10. A substantially rectangular air bearing magnetic head slider having leading and trailing edges and substantially parallel sides comprising:
 a nonmagnetic substrate having an air bearing surface;
 first and second side rails formed along said sides of said surface, said first and said second side rails projecting out from said air bearing surface and having top surfaces;
 a wishbone-shaped rail configuration formed between said rails on said substrate surface and projecting out from said air bearing surface, said wishbone shaped rail configuration having spaced first and second branching segments extending substantially parallel to said first and said second side rails, said wishbone shaped rail configuration extending for a portion of the distance between said trailing edge and said leading edge, said first and second branching segments having top surfaces, said wishbone shaped rail configuration having third and fourth branching segments disposed at an angle relative to said substantially parallel first and second sides of said first and second branching segments, said third and fourth branching segments being connected respectively to said first and second branching segments;
 a narrow trunk portion having a leading edge taper projecting out from said air bearing surface and extending from said leading edge for connection to the junction of said third and fourth branching segments of said wishbone rail configuration;
 including first and second leading edge tapers located at said leading edges of said first and second side rails respectively, and projecting out from said air bearing surface;
 wherein said wishbone-shaped rail configuration includes first and second segments that form a V geometry with a closure at one end of each of said first and second segments, a third segment extending from said closure towards said leading edge, fourth and fifth segments extending from the other end of each of said first and second segments towards said trailing edge, a subambient pressure region between said first, second, fourth and fifth segments,
 wherein said wishbone rail configuration is offset relative to the central longitudinal axis of said slider.

11. A substantially rectangular air bearing magnetic head slider having leading and trailing edges and substantially parallel sides comprising:
 a nonmagnetic substrate having an air bearing surface;
 first and second side rails formed along said sides of said surface, said first and said second side rails projecting out from said air bearing surface and having top surfaces;
 a wishbone-shaped rail configuration formed between said rails on said substrate surface and projecting out from said air bearing surface, said wishbone shaped rail configuration having spaced first and second branching segments extending substantially parallel to said first and said second side rails, said wishbone shaped rail configuration extending for a portion of the distance between said trailing edge and said leading edge, said first and second ranching segments having top surfaces, said wishbone shaped rail configuration having third and fourth branching segments disposed at an angle relative to said substantially parallel first and second sides of said first and second branching segments said third and fourth branching segments being connected respectively to said first and second branching segments;
 a narrow trunk portion having a leading edge taper projecting out from said air bearing surface and extending from said leading edge for connection to the junction of said third and fourth branching segments of said wishbone rail configuration;
 including first and second leading edge tapers located at said leading edges of said first and second side rails respectively, and projecting out from said air bearing surface;
 wherein said wishbone-shaped rail configuration includes first and second segments that for, a V geometry with a closure at one end of each of said first and second segments, a third segment extending from said closure towards said leading edge, fourth and fifth segments extending from the other end of each of said first and second segments towards said trailing edge, a subambient pressure region between said first, second, fourth and fifth segments,
 including a third leading edge taper located at the leading edge of said third segment.

12. A magnetic head slider as in claim 11, wherein said third taper is narrower than said first and second tapers.

13. A substantially rectangular air bearing magnetic head slider having leading and trailing edges and substantially parallel sides comprising:
 a nonmagnetic substrate having an air bearing surface;
 first and second tapers formed at said slider leading edge adjacent to said sides of said slider and projecting out from said air bearing surface;
 first and second pads joined to and extending from said tapers respectively and projecting out from said air bearing surface;
 a wishbone-shaped rail configuration formed with two branching arms extending from said trailing edge toward said leading edge, said arms having first and second side rail portions extending from said trailing edge and projecting out from said air bearing surface, said side rail portions being spaced from said pads, angled rail portions extending from said side rail portions, a V-shaped portion to which said angled portions are joined, a central taper extending from said leading edge, and a rectangular portion disposed between said central taper and said V-shaped portion.

14. An air bearing magnetic head slider as in claim 13, including a recessed area extending from said trailing slider edge and disposed between said extending arms.

15. An air bearing magnetic head slider as in claim 13, wherein said extending arms are curvilinear in shape and said pads have arcuate ends.

* * * * *